United States Patent
Ohsumi

(10) Patent No.: US 10,169,554 B2
(45) Date of Patent: Jan. 1, 2019

(54) WORK SUPPORT SYSTEM, WORK SUPPORT METHOD AND COMPUTER-READABLE RECORDING MEDIUM

(71) Applicant: CASIO COMPUTER CO., LTD., Shibuya-ku, Tokyo (JP)

(72) Inventor: Tsuyoshi Ohsumi, Akiruno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 102 days.

(21) Appl. No.: 15/176,007

(22) Filed: Jun. 7, 2016

(65) Prior Publication Data

US 2017/0039679 A1 Feb. 9, 2017

(30) Foreign Application Priority Data

Aug. 3, 2015 (JP) .................. 2015-153090

(51) Int. Cl.
G09G 5/00 (2006.01)
G06F 21/31 (2013.01)
G06Q 10/06 (2012.01)
G06F 3/0482 (2013.01)

(52) U.S. Cl.
CPC ............ *G06F 21/31* (2013.01); *G06F 3/0482* (2013.01); *G06Q 10/06314* (2013.01)

(58) Field of Classification Search
None
See application file for complete search history.

(56) References Cited

U.S. PATENT DOCUMENTS 9,164,656 B1 * 10/2015 Keller .............. G05B 19/41865
2006/0031776 A1 * 2/2006 Glein .................. G06F 3/0481
715/779
2008/0065460 A1 * 3/2008 Raynor ................. G06Q 10/06
705/7.21

(Continued)

FOREIGN PATENT DOCUMENTS

JP 2014518409 A 7/2014

OTHER PUBLICATIONS cmarcotte, "Tutorial: Wunderlist", Aug. 4, 2014, URL: https://vimeo.com/102578161.*

(Continued)

*Primary Examiner* — David H Chu
(74) *Attorney, Agent, or Firm* — Holtz, Holtz & Volek PC

(57) ABSTRACT

A work support system of an embodiment of the present invention includes a list display control unit to display, on a display device, a first list including a plurality of unprocessed task indices and a second list including a plurality of processed task indices and a first moving display control unit to display, when attribution of one of the unprocessed task indices in the first list is changed to a processed task index, the task index, attribution of which is changed, in a moving manner from the first list to the second list, wherein the first moving display control unit displays such that the task index attribution of which is changed is visually recognized as passing behind the unprocessed task indices when displaying such that the task index, attribution of which is changed, passes a display location of at least the unprocessed task indices of other task indices.

16 Claims, 8 Drawing Sheets

(56) References Cited

U.S. PATENT DOCUMENTS

| | | | |
|---|---|---|---|
| 2010/0057757 A1* | 3/2010 | Biondi | G06F 9/5038 |
| | | | 707/E17.009 |
| 2010/0199306 A1* | 8/2010 | Colter | G06F 3/0483 |
| | | | 725/38 |
| 2010/0262653 A1* | 10/2010 | Chaffee | G06Q 10/06 |
| | | | 709/203 |
| 2011/0126123 A1* | 5/2011 | Reter | G06Q 10/109 |
| | | | 715/751 |
| 2012/0254805 A1* | 10/2012 | Pic | G06F 3/0482 |
| | | | 715/834 |
| 2012/0309363 A1 | 12/2012 | Gruber et al. | |
| 2012/0311583 A1 | 12/2012 | Gruber et al. | |
| 2012/0311584 A1 | 12/2012 | Gruber et al. | |
| 2012/0311585 A1 | 12/2012 | Gruber et al. | |
| 2014/0173602 A1* | 6/2014 | Kikin-Gil | G06Q 10/109 |
| | | | 718/100 |
| 2014/0237389 A1* | 8/2014 | Ryall | H04L 65/403 |
| | | | 715/753 |
| 2016/0231888 A1* | 8/2016 | Govindraj | G06F 3/0482 |
| 2017/0140342 A1* | 5/2017 | Jones | G06Q 10/1097 |

OTHER PUBLICATIONS

Usman, "Wunderlist Update Brings Smart Due Dates, Duplicate Lists and More", Jul. 16, 2015, URL: https://web.archive.org/web/20150720203356/http://www.iphoneincanada.ca/news/wunderlist-smart-due-dates-duplicate-lists/.*

Soueidan, "Creative Add/Remove Effects for List Items with CSS3 Animations", Jul. 27, 2013, URL: https://www.sarasoueidan.com/blog/creative-list-effects/.*

* cited by examiner

WORK SUPPORT SYSTEM, WORK SUPPORT METHOD AND COMPUTER-READABLE RECORDING MEDIUM

BACKGROUND OF THE INVENTION

1. Field of the Invention

The present invention relates to a work support system, work support method and computer-readable recording medium.

2. Background Art

Managers of small and medium-sized enterprises or persons in charge of stores are desired to proceed a number of tasks such as sales management, salary management, employment management of workers, and production of point of purchase advertising (POP) in parallel in a well-planned manner. Proceeding a plurality of tasks in parallel in this manner complicates progress management, which may result in risks of delay, quality deterioration, or excessive quality.

Therefore, there is a tool for scheduling dates of the respective tasks. The scheduling tool is provided for example as a web application. Task information can be read, added, or revised from smartphones, tablets, or personal computers.

The summary of Japanese National Publication of International Patent Application No. 2014-518409 describes that "Described are a technique for generating a task item, technique for organizing the task item, technique for causing notification of the task item, and technique for consuming the task item. In one approach, the task item is generated based on input from a user and the context of the input. In another approach, different attribution of the task items is used in order to intelligently organize the task items into a plurality of lists. In still another approach, one or more criteria such as a location are used in order to determine when to notify the task item to the user. In yet another approach, actions, other than generation of notification, such as sending an email, talking, sending a text, and searching are enabled or executed automatically."

In such a scheduling tool, inputting the respective task information is complicated. For example with an invention of the aforementioned Japanese National Publication of International Patent Application No. 2014-518409, a user is required to input information for specifying a task.

In the invention of Japanese National Publication of International Patent Application No. 2014-518409, unprocessed task indices and processed task indices are mixed and thereby displayed. This arrangement is not always desired by a user.

SUMMARY OF THE INVENTION

An object of the present invention is to appropriately display unprocessed task indices and processed task indices.

A work support system of an embodiment of the present invention includes a list display control unit to display, on a display device, a first list including a plurality of unprocessed task indices and a second list including a plurality of processed task indices and a first moving display control unit to display, when attribution of one of the unprocessed task indices in the first list is changed to a processed task index, the task index, attribution of which is changed, in a moving manner from the first list to the second list, wherein the first moving display control unit displays such that the task index attribution of which is changed is visually recognized as passing behind the unprocessed task indices when displaying such that the task index, attribution of which is changed, passes a display location of at least the unprocessed task indices of other task indices.

A work support method of an embodiment of the present invention includes a list display control step of displaying, on a display device, a first list including a plurality of unprocessed task indices and a second list including a plurality of processed task indices and a first moving display control step of displaying, when attribution of one of the unprocessed task indices in the first list is changed to a processed task index, the task index, attribution of which is changed, in a moving manner from the first list to the second list, wherein the first moving display control step includes displaying such that the task index attribution of which is changed is visually recognized as passing behind the unprocessed task indices when displaying such that the task index, attribution of which is changed, passes a display location of at least the unprocessed task indices of other task indices.

A non-transitory computer-readable recording medium of an embodiment of the present invention storing a program for causing a computer to execute the procedures of displaying, on a display device, a first list including a plurality of unprocessed task indices and a second list including a plurality of processed task indices and displaying, when attribution of one of the unprocessed task indices in the first list is changed to a processed task index, the task index, attribution of which is changed, in a moving manner from the first list to the second list, wherein the procedure of displaying the task index, attribution of which is changed to the processed task index includes displaying such that the task index attribution of which is changed is visually recognized as passing behind the unprocessed task indices when displaying such that the task index, attribution of which is changed, passes display locations of at least the unprocessed task indices of other task indices.

The present invention allows for appropriately displaying the unprocessed task indices and processed task indices.

DETAILED DESCRIPTION OF THE PREFERRED EMBODIMENT

Hereinafter, an embodiment for carrying out the present invention will be described in detail with reference to the respective drawings.

Figure 1:
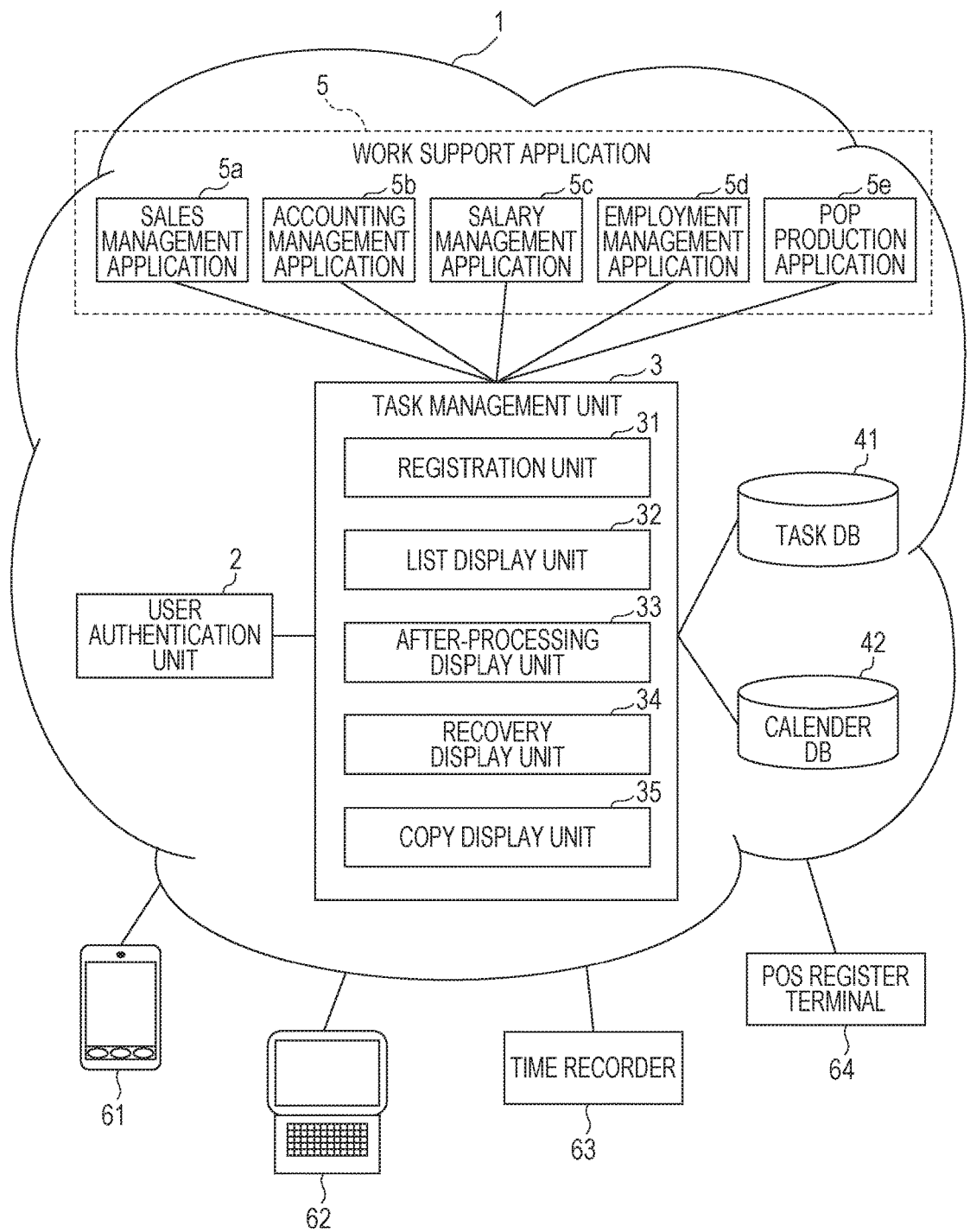
FIG. 1 is a configuration diagram illustrating an outline of a work support system of the present embodiment.

FIG. 1 is a configuration diagram illustrating an outline of a work support system 1 of the present embodiment.

The work support system 1 includes a user authentication unit 2, task management unit 3, task database 41, calendar database 42, and work support applications 5. The user authentication unit 2, task management unit 3, and work support applications 5 are implemented by execution of a work support program by a web server not illustrated.

The web server includes a central processing unit (CPU) and a memory as a hardware configuration. The CPU controls respective units of the web server. The CPU reads a specified program from among a system program and application programs stored in the memory and deploys in a random access memory (RAM), where various processing is executed in cooperation with the program.

This work support system 1 displays task indices on a display device such as a smartphone 61 or personal computer 62, thereby supporting performance of the task by a user. The work support system 1, for example when detecting that the task index is clicked on, activates one of the work support applications 5 to allow the user to perform the task.

The work support applications 5 include a sales management application 5a to manage sales of a store, accounting management application 5b to manage accounting of a store, a salary management application 5c to manage salary of workers, employment management application 5d to manage shift of workers, and a point of purchase advertising (POP) production application 5e to produce POP, but are not limited thereto. Incidentally, attendance information collected by a time recorder 63 is used by the employment management application 5d. Sales information collected by a point of sales (POS) register terminal 64 is used by the sales management application 5a.

The user authentication unit 2 causes a terminal accessing the work support system 1 to display a login screen and thereby authenticates whether the user is a registered user.

The task management unit 3 includes a registration unit 31 to register task information, list display unit 32 to display a list of task indices, after-processing display unit 33, recovery display unit 34, and copy display unit 35. The after-processing display unit 33, recovery display unit 34, and copy display unit 35 are implemented by transfer to and execution on the smartphone 61 or personal computer 62 of a program described in, for example JavaScript (registered trademark).

The registration unit 31 accepts user operation and registers the task information in the task database 41 or calendar database 42. Incidentally, each of the databases is abbreviated to "DB" in the drawings.

The list display unit 32 (list display control unit) displays, on a display device of the smartphone 61 or personal computer 62, an unprocessed list (first list) including unprocessed task indices and a processed list (second list) including processed task indices. Here, the unprocessed task index displays task information not yet processed by the user and is a screen element configured to allow activation of the work support application 5 related to a task by clicking thereon or the like. Also, the processed task index is a screen element to display task information processed by the user.

The after-processing display unit 33 (first moving display control unit) displays, when attribution of the unprocessed task index is changed to a processed task index, the task index, attribution of which is changed, in a moving manner from the unprocessed list to the processed list.

The recovery display unit 34 (second moving display control unit) displays, when attribution of one of the processed task indices in the processed list is changed to an unprocessed task index, the task index, attribution of which is changed to the unprocessed task index, in a moving manner from the processed list to the unprocessed list.

The copy display unit 35 (third moving display control unit) displays, when one of the processed task indices in the processed list is copied as an unprocessed task index, the copied task index in a moving manner from the processed list to the unprocessed list. This moving display allows for displaying transition between the unprocessed task index and processed task index in a preferable manner.

Figure 2:
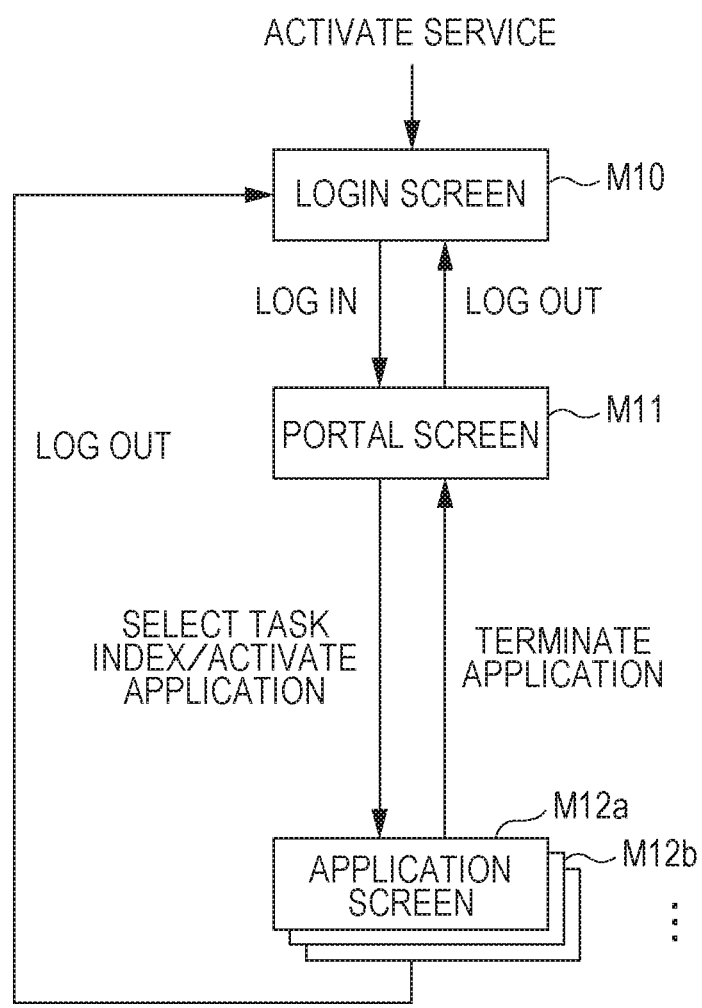
FIG. 2 is a diagram illustrating mode transition of the work support system.

FIG. 2 is a diagram illustrating mode transition of the work support system 1.

Displaying a uniform resource locator (URL) of the work support system 1 on a web browser or the like results in activation of work support service. Immediately after activation, the work support system 1 displays the login screen (mode M10).

Login operation by the user on the login screen of mode M10 results in transition to a ToDo portal screen (mode M11). On this ToDo portal screen, selection of the task index or logout can be performed. Incidentally, ToDo refers to a task to be performed by a user.

Selecting the task index on the portal screen of mode M11 results in activation of the corresponding application and transition to one of application screens (mode M12a, M12b, . . . ). On the application screen, termination of and logout from the application can be performed.

Terminating the application on the application screen such as mode M12a results in returning to the portal screen of mode M11.

Performing logout on the portal screen of mode M11 or an application screen such as mode M12a results in returning to the login screen (mode M10).

In this manner, the work support system 1 can not only simply display the unprocessed task indices on the ToDo portal screen but also activate the application related to the unprocessed task index for processing the unprocessed task.

Figure 3:
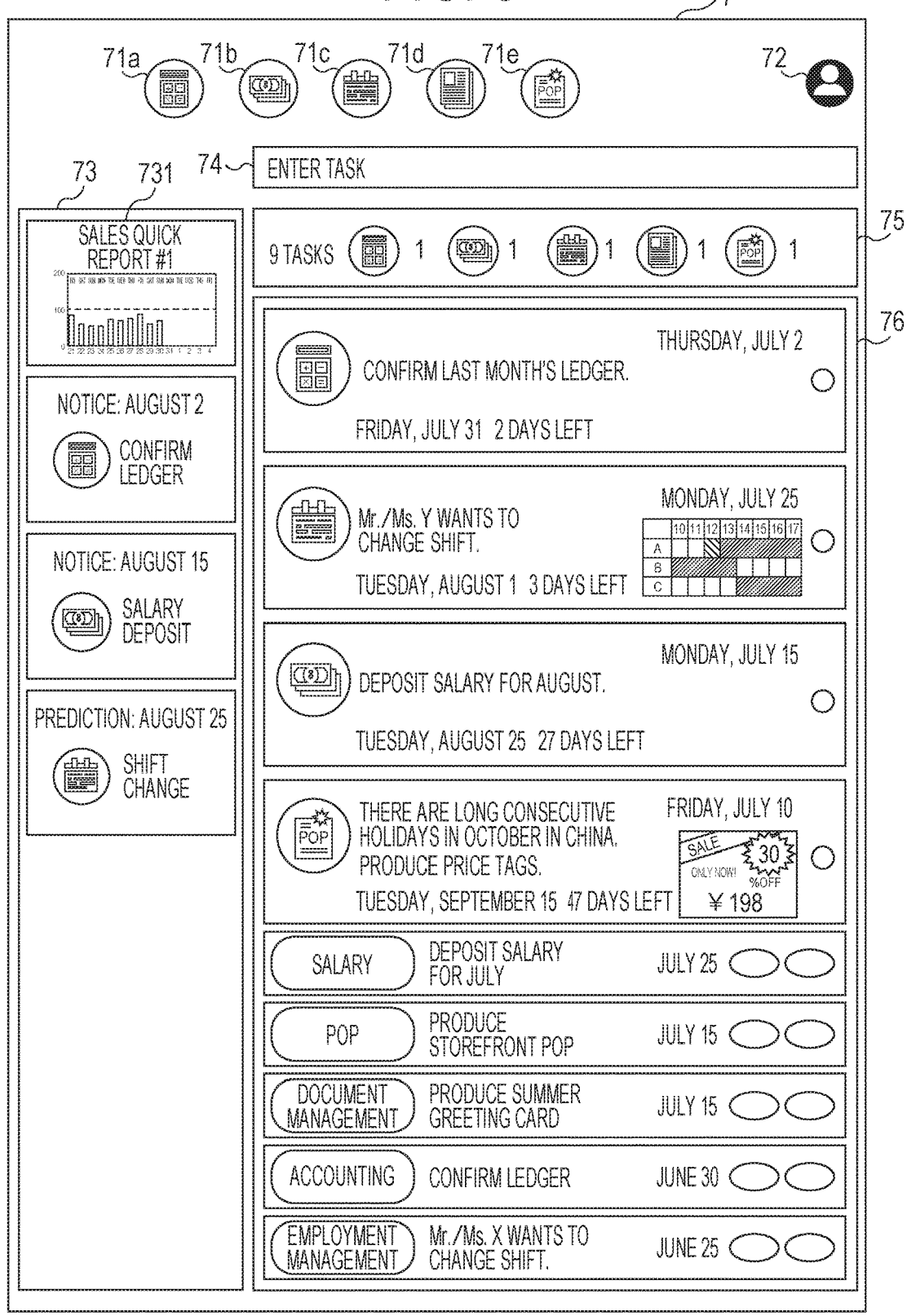
FIG. 3 is a diagram explaining a main screen of a ToDo portal.

FIG. 3 is a diagram explaining a main screen 7 of the ToDo portal.

As illustrated in FIG. 3, a main screen 7 includes a menu area for displaying menus 71a to 71e, account icon 72, gadget pane 73, task input text box 74, narrowing area 75, and ToDo list pane 76.

The menu 71a displays an icon related to sales management and clicking on this menu 71a results in activation of the sales management application 5a.

The menu 71b displays an icon related to accounting management and clicking on this menu 71b results in activation of the accounting management application 5b.

The menu 71c displays an icon related to salary management and clicking on this menu 71c results in activation of the salary management application 5c.

The menu 71d displays an icon related to employment management and clicking on this menu 71d results in activation of the employment management application 5d.

The menu 71e displays an icon related to POP production and clicking on this menu 71e results in activation of the POP production application 5e.

Clicking on the account icon 72 results in display of an account name of the user as well as a logout button. Clicking on the logout button results in logout and transition to the login screen illustrated in FIG. 2.

The gadget pane 73 displays one or more gadgets 731. The gadget 731 displays, for example, sales quick report, notice information of future tasks, task information predicted to be proposed, or the like. The gadget pane 73 is configured to be scrollable by the user.

The task input text box 74 is an area for inputting letters and displays "Enter task." in a default state.

Inputting letters in this area and pressing the return key results in new registration of task information and a new unprocessed task index is added to the ToDo list pane 76.

The narrowing area 75 displays an icon for narrowing the task indices to be displayed in the ToDo list pane 76. For example, when the user clicks on an icon related to sales management (the same icon as the icon representing the menu 71*a*), the task indices displayed in the ToDo list pane 76 are narrowed into those related to the sales management application 5*a*.

The ToDo list pane 76 is an area for displaying a list of one or more task indices and is configured to be scrollable by the user. The ToDo list pane 76 will be described in detail with FIG. 4 later.

Figure 4:
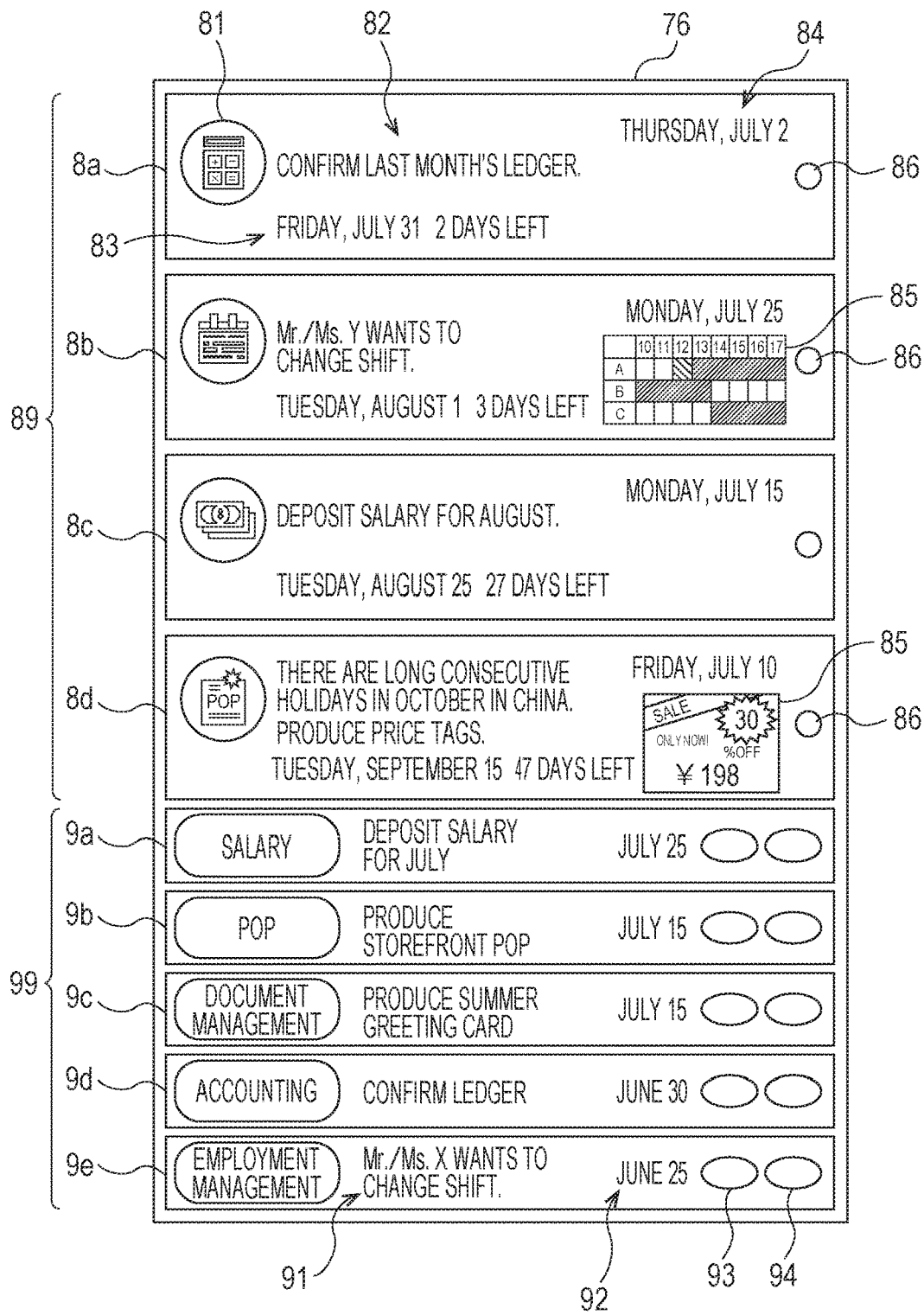
FIG. 4 is a diagram explaining an exemplary ToDo list pane.

FIG. 4 is a diagram explaining an exemplary ToDo list pane 76.

The ToDo list pane 76 illustrated in FIG. 4 is caused to display an unprocessed list 89 including unprocessed task indices 8*a* to 8*d* and a processed list 99 including processed task indices 9*a* to 9*e* by the list display unit 32. The processed list 99 is displayed below the unprocessed list 89. Default is displaying the unprocessed list 89 in a preferential manner. The task indices displayed in the ToDo list pane 76 includes both of the unprocessed task indices 8*a* to 8*d* and processed task indices 9*a* to 9*e*.

The unprocessed task indices 8*a* to 8*d* have a rectangular shape with longer lateral sides and include an application icon 81 on the left side, comment 82 in the center, scheduled date of performance 83 in the lower side, drafting date 84 on the upper right side, and a processed check box 86, as well as a thumbnail 85 as appropriate. The unprocessed task indices 8*a* to 8*d* represent, to the user, information of tasks processing of which has not yet been completed.

Hereinafter, when the unprocessed task indices 8*a* to 8*d* are not specifically discriminated, they are simply referred to as the unprocessed task indices 8.

The unprocessed task indices 8*a* to 8*d* are displayed in the order of scheduled date of performance 83 with an earlier date displayed earlier.

The scheduled date of performance 83 is a date when processing is scheduled as well as a deadline of processing.

This allows the work support system 1 to explicitly display, of the unprocessed task indices 8, those with the earlier scheduled date of performance 83 and an approaching deadline and thus with higher urgency. That is, this allows for displaying in such a manner as to facilitate visually recognizing which task is important as of the present time.

The application icon 81 is an icon for the application for processing an unprocessed task related to the unprocessed task index 8.

The comment 82 is a comment forming information of the unprocessed task related to the unprocessed task index 8.

The scheduled date of performance 83 is a date information of a deadline for processing the unprocessed task related to the unprocessed task index 8. The remaining number of days to the scheduled date of performance 83 is displayed next to the scheduled date of performance 83.

The drafting date 84 is basically a date of drafting the unprocessed task index 8; however, when the unprocessed task index 8 is revised, the revised date is also reflected to the drafting date 84.

The thumbnail 85 is a thumbnail image representing details of the unprocessed task related to the unprocessed task index 8 or a processing result thereof.

The processed check box 86 is checked by user operation when processing of a task related to the unprocessed task index 8 is completed.

This allows the unprocessed task index 8 to transit to the processed task index 9 and then to drop to the processed list 99 to settle thereat for a predetermined period. Operations when the processed check box 86 is checked will be described in detail with FIGS. 5A to 5D later.

The processed task indices 9*a* to 9*e* have a rectangular shape with longer lateral sides and include display of a name of the application, comment 91 in the center, completed date 92, copy button 93, and recover button 94. The processed task indices 9*a* to 9*e* represent, to the user, information of tasks processing of which has been completed recently.

Hereinafter, when the processed task indices 9*a* to 9*e* are not specifically discriminated, they are simply referred to as the processed task indices 9.

Only the processed task index 9 with the completed date 92 of within a latest predetermined period (e.g. five weeks) is displayed while the processed task index 9 which has passed the predetermined period is no longer displayed. This allows the user to confirm the processed task index 9 at a later date and not to be annoyed by processed task information with no necessity of confirmation after passing the predetermined period.

The copy button 93 is a button for copying the task information related to the processed task index 9 and registering as new unprocessed task information. The recover button 94 is a button for recovering the task information related to the processed task index 9 as the unprocessed task information. Operations when the copy button 93 or recover button 94 is clicked will be described in detail with FIGS. 6A to 6D and FIGS. 7A to 7B later.

FIGS. 5A to 5D are diagrams explaining how the unprocessed task index 8 drops into the processed list 99.

Figure 5A:
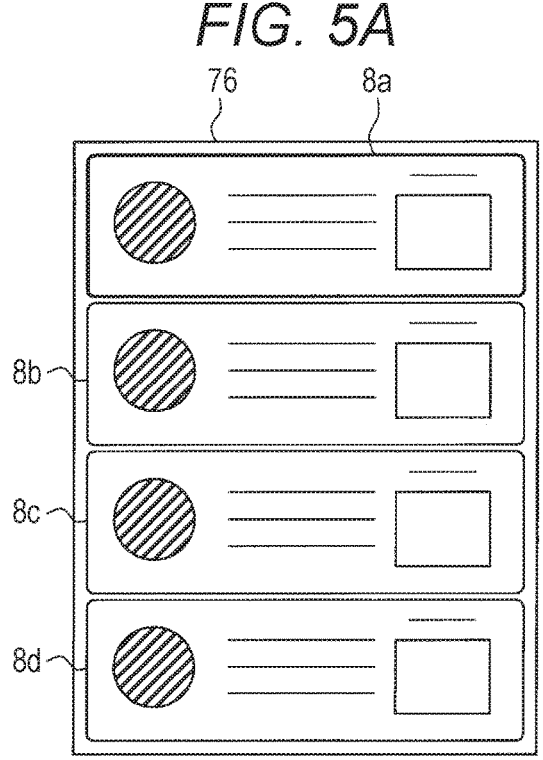
FIGS. 5A to 5D are diagrams explaining how a task index drops.

FIG. 5A is a diagram illustrating an initial state.

The ToDo list pane 76 includes the unprocessed task indices 8*a* to 8*d*. Here, when the processed check box 86 in the unprocessed task index 8*a* (see FIG. 4) is checked and attribution thereof is changed, transition to a state of FIG. 5B occurs.

Figure 5B:
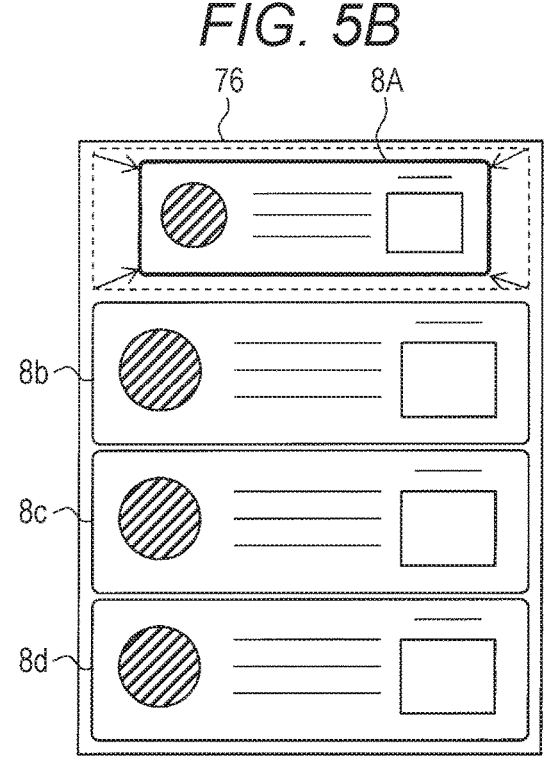

FIG. 5B is a diagram illustrating reduction display.

The task index 8A attribution of which is changed is displayed with phased reduction by the after-processing display unit 33. This allows for obtaining a visual effect as if the task index 8A is detracted behind the other unprocessed task indices 8*b* to 8*d*. This task index 8A is also included in the task indices displayed in the ToDo list pane 76. After this reduction display, transition to a state of FIG. 5C occurs.

Figure 5C:
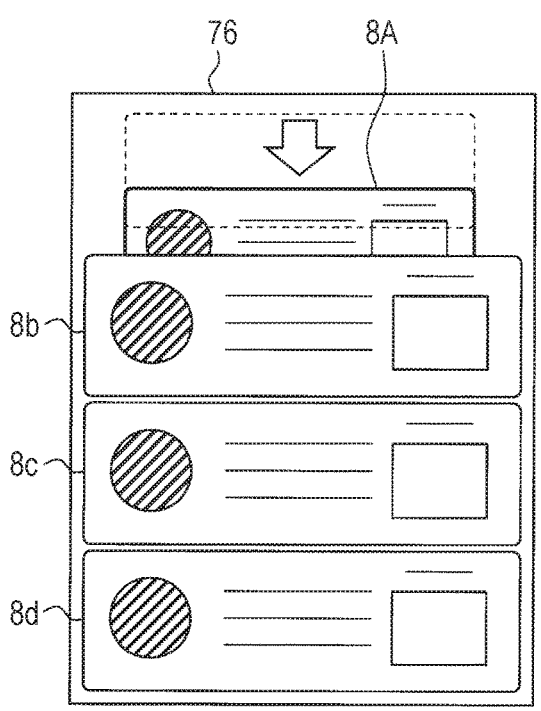

FIG. 5C is a diagram illustrating parallel movement.

The task index 8A attribution of which is changed is caused to move downward in a parallel manner by the after-processing display unit 33. With this parallel movement, the task index 8A is hidden behind the other unprocessed task indices 8*b* to 8*d*. When the task index 8A attribution of which is changed is displayed such that the task index 8A passes display locations of the other unprocessed task indices 8*b* to 8*d*, the after-processing display unit 33 displays the task index 8A attribution of which is changed is visually recognized as passing behind the unprocessed task indices 8*b* to 8*d*.

This allows for obtaining a visual effect as if the task index 8A is moving downward in a parallel manner behind the other unprocessed task indices 8*b* to 8*d*. After this parallel movement, transition to a state of FIG. 5D occurs.

Incidentally, a task index related to a task which required a lot of time for processing or a task indices related to a task which was processed after the scheduled date of performance 83 may drop to the lower part of the screen with eye-catching display change.

Here, the eye-catching display change includes, unlike the task indices related to tasks normally processed, moving downward in a parallel manner after repeating reduced display and enlarged display for several times or dropping with varying colors or brightness of the task index, for example moving downward in a parallel manner with reduced display and changing into dark red color.

Figure 5D:
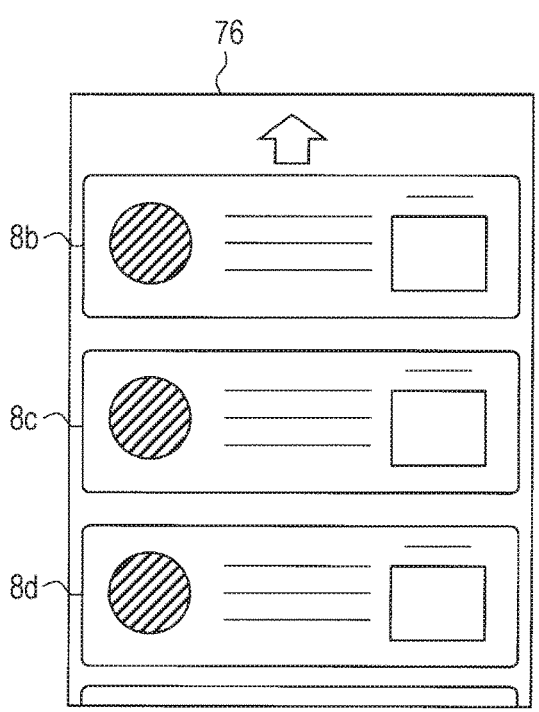

FIG. 5D is a diagram illustrating parallel movement of the other unprocessed task indices 8b to 8d.

The other unprocessed task indices 8b to 8d are caused to move upward in a parallel manner and to fill the location where the unprocessed task index 8a has existed by the after-processing display unit 33. With this, a series of operations ends.

Such moving display allows for showing that the unprocessed task index 8 attribution of which is changed to "processed" moves toward the processed list 99. Moreover, since the task index attribution of which is changed to "processed" is subjected to reduced display and then moves behind the other unprocessed task indices 8, the other unprocessed task indices 8 can stand out relative to the processed task index.

FIGS. 6A to 6D are diagrams explaining movement of a task index when a task recovers (#1).

Figure 6A:
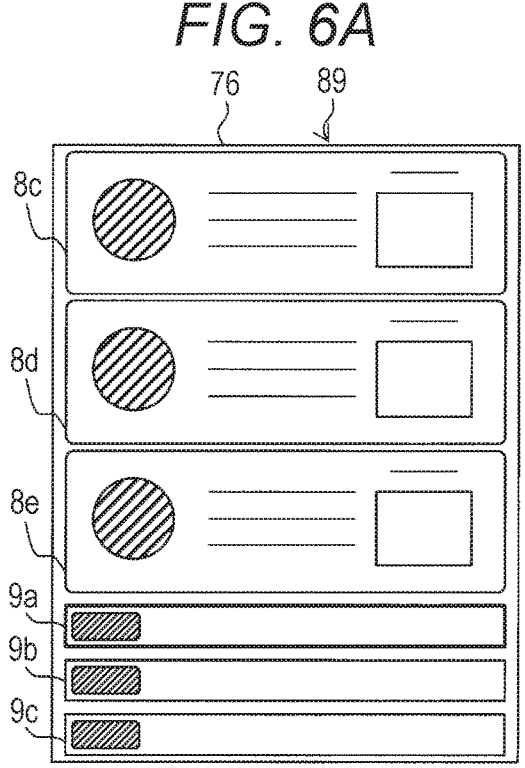
FIGS. 6A to 6D are diagrams explaining movement of a task index when a task recovers (#1)

FIG. 6A is a diagram illustrating an initial state.

The ToDo list pane 76 includes the unprocessed task indices 8c to 8e and processed task indices 9a to 9c. Here, when the recover button 94 in the processed task index 9a (see FIG. 4) is clicked, transition to a state of FIG. 6B occurs.

Incidentally, when the copy button 93 in the processed task index 9a (see FIG. 4) is clicked, task information is copied by the copy display unit 35 instead of recovery of the task by the recovery display unit 34.

Figure 6B:
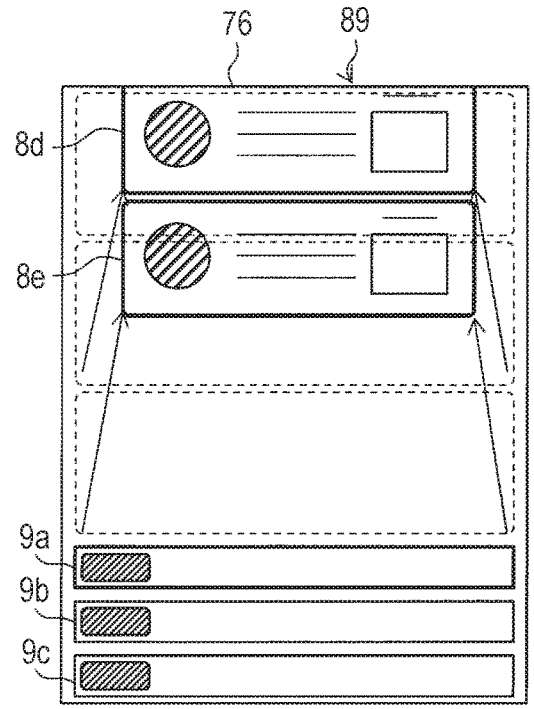

FIG. 6B is a diagram illustrating reduction display.

The unprocessed list 89 including the unprocessed task indices 8c to 8e is displayed with phased reduction by the recovery display unit 34. This allows for obtaining a visual effect as if the unprocessed list 89 is detracted behind the processed task indices 9a to 9c. After this reduction display, transition to a state of FIG. 6C occurs.

Figure 6C:
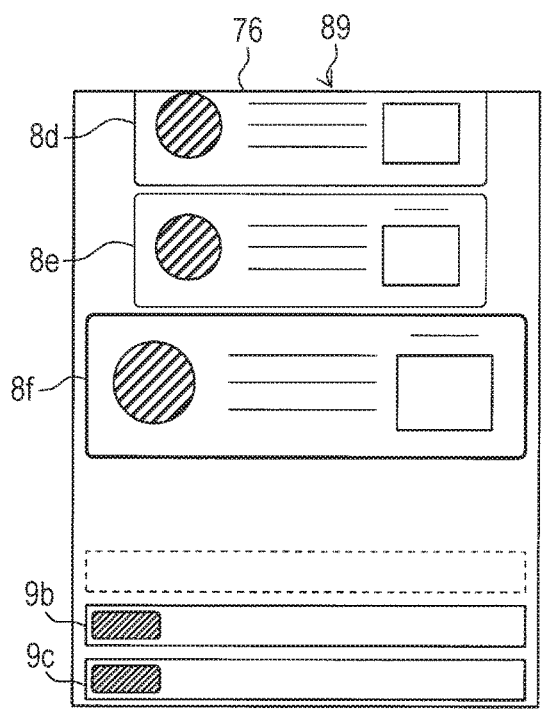

FIG. 6C is a diagram illustrating enlarged display.

The processed task index 9a is displayed with phased enlargement by the recovery display unit 34 and transits to the task index 8f. After this enlarged display, transition to a state of FIG. 6D occurs. Incidentally, upon copying, the processed task index 9a is displayed as copied while being subjected to phased enlargement by the copy display unit 35 and transits to the task index 8f, operations other than which are similar to those of recovery.

Figure 6D:
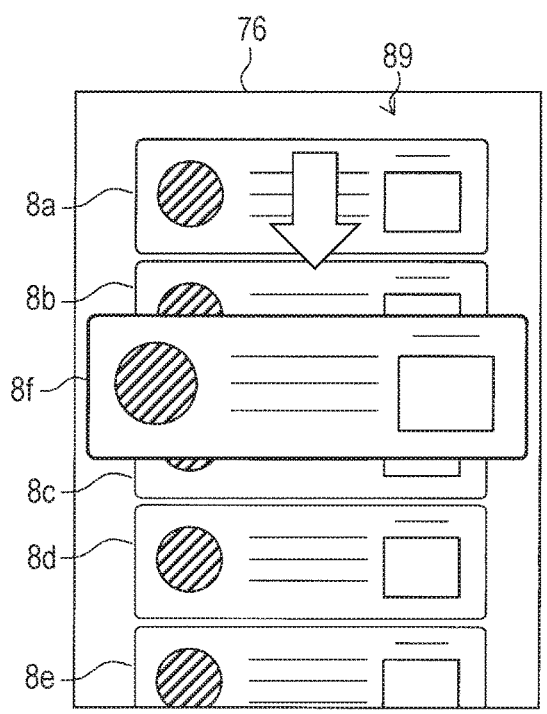

FIG. 6D is a diagram illustrating parallel movement of the unprocessed list 89.

The unprocessed list 89 subjected to reduced display is caused to move downward in a parallel manner by the recovery display unit 34.

Here, the task index 8f is displayed with higher priority. The recovery display unit 34 displays the task index 8f attribution of which is changed to the unprocessed task index 8 to stop at a predetermined location of the screen and displays the other unprocessed task indices 8a to 8e passing therebehind. This allows for displaying such that the task index 8f attribution of which is changed is visually recognized as passing in front of the other unprocessed task indices 8a to 8e.

Incidentally, the other unprocessed task indices 8a to 8e may be displayed to stop at a predetermined location of the screen and the task index 8f may be displayed to pass in front of the other unprocessed task indices 8a to 8e. This also allows for displaying such that the task index 8f attribution of which is changed is visually recognized as passing in front of the other unprocessed task indices 8a to 8e. After this parallel movement, transition to a state of FIG. 7A occurs.

Figure 7A:
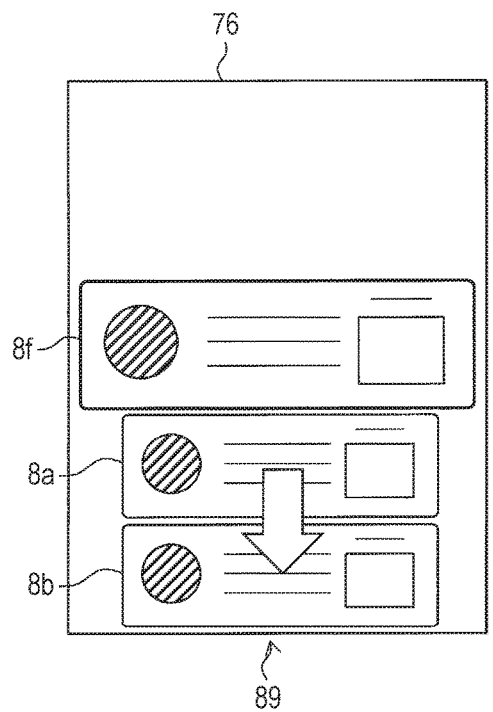
FIGS. 7A to 7B are diagrams explaining movement of a task index when the task recovers (#2)
Figure 7B:
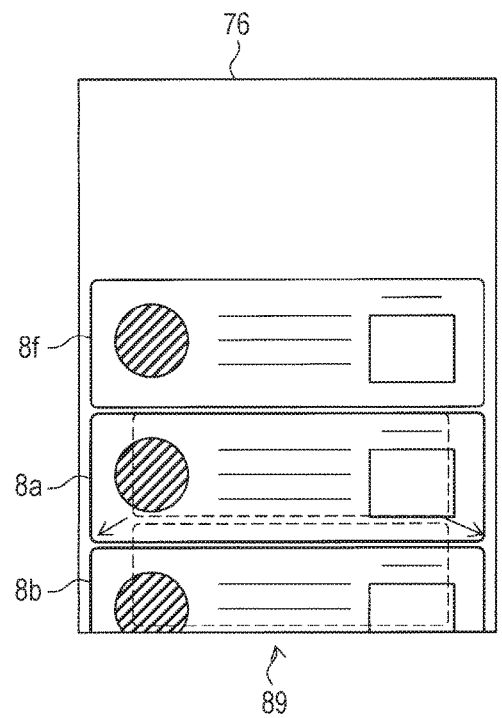

FIGS. 7A and 7B are diagrams explaining movement of a task index when the task recovers (#2).

FIG. 7A is a diagram illustrating when parallel movement of the unprocessed list 89 is finished.

The unprocessed list 89 subjected to reduced display completes parallel movement and is located immediately below the task index 8f. After this parallel movement is finished, transition to a state of FIG. 7B occurs.

FIG. 7B is a diagram illustrating recovery of the unprocessed list 89.

The unprocessed list 89 is displayed with phased enlargement by the recovery display unit 34 and returns to the original size. With this, moving display upon recovery of a task ends.

When the task information is recovered to be the unprocessed task index 8, the task index attribution of which is changed is displayed such that the task index is visually recognized as passing in front of the other unprocessed task indices 8. This allows for displaying the task index attribution of which is changed in a highlighted manner such that the user can be aware of.

Also when the task information is recovered to be the unprocessed task index 8, it is desired to grasp how urgent the task information related to this unprocessed task index 8 is. For this end, it is desired to grasp where the recovered unprocessed task index 8 is located in the unprocessed list 89 unlike in the case of processing the unprocessed task index 8. According to display of the recovered task illustrated in FIGS. 6A to 6D and FIGS. 7A to 7B, a location (urgency) of the recovered unprocessed task index 8 can be easily grasped.

FIGS. 8A to 8D are diagrams explaining how the unprocessed task index 8 drops into a processed list 99 in another manner.

Figure 8A:
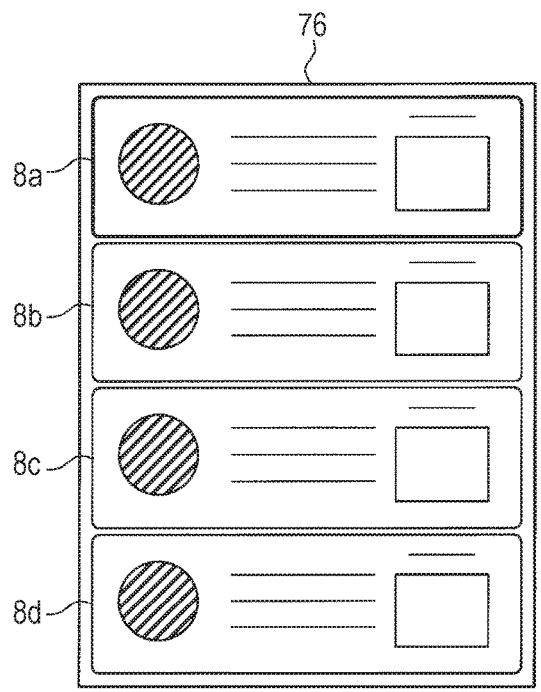
FIGS. 8A to 8D are diagrams explaining how a task index drops in another manner.

FIG. 8A is a diagram illustrating an initial state. The ToDo list pane 76 includes the unprocessed task indices 8a to 8d. Here, when the processed check box 86 in the unprocessed task index 8a (see FIG. 4) is checked and attribution thereof is changed, transition to a state of FIG. 8B occurs.

Figure 8B:
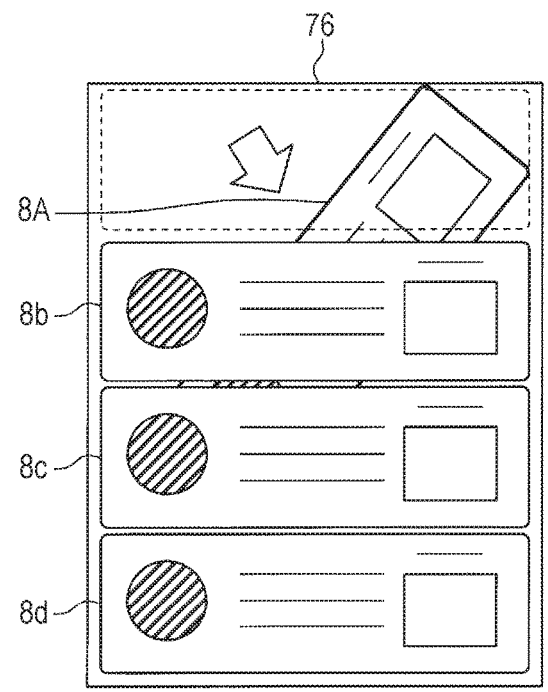

FIG. 8B is a diagram illustrating swinging display. The task index 8A attribution of which is changed is displayed as swinging like a pendulum with one point on the right side fixed by the after-processing display unit 33. After this swinging display, transition to a state of FIG. 8C occurs.

Figure 8C:
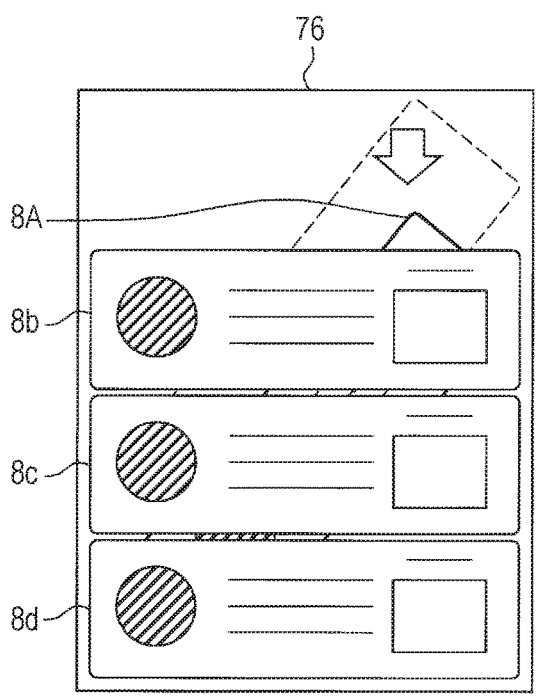

FIG. 8C is a diagram illustrating parallel movement. The task index 8A attribution of which is changed is caused to move downward in a parallel manner by the after-processing display unit 33. With this parallel movement, the task index 8A is hidden behind the other unprocessed task indices 8b to 8d. After this parallel movement, transition to a state of FIG. 8D occurs.

Figure 8D:
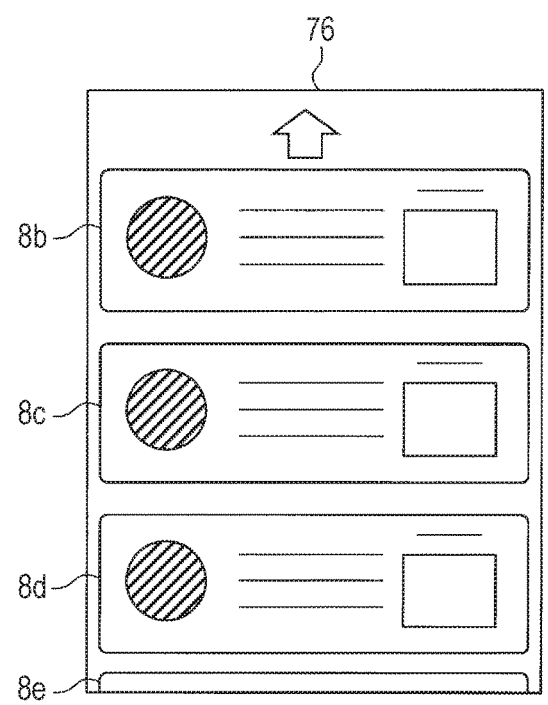

FIG. 8D is a diagram illustrating parallel movement of the other unprocessed task indices 8b to 8d.

The other unprocessed task indices 8b to 8d are caused to move upward in a parallel manner and to fill the location where the unprocessed task index 8*a* has existed by the after-processing display unit 33. With this, a series of operations ends.

Such moving display allows for showing that the unprocessed task index 8 attribution of which is changed to "processed" moves toward the processed list 99.

(Variations)

The present invention is not limited to the aforementioned embodiment but may be implemented with modifications without departing from the principals of the present invention. For example, the following (a) to (c) are included.

(a) When the unprocessed task index 8 is subjected to reduced display while dropping to the processed list 99, reduced display is not limited to the task index attribution of which is changed, but, on the contrary, may be applied to the other unprocessed task indices 8. Here, the task index attribution of which is changed is displayed such that the task index is visually recognized as passing in front of the other unprocessed task indices 8.

(b) When the processed task index 9 is subjected to reduced display upon recovery, reduced display is not limited to the other unprocessed task indices 8, but, on the contrary, may be applied to the task index attribution of which is changed. Here, the task index attribution of which is changed passes behind the other unprocessed task indices 8.

(c) Arrangement of the task indices is not limited to be vertical but may be horizontal.

The invention claimed is:

1. A work support system, comprising:
a processor configured to perform a display control process to display, on a display, a first list including a plurality of unprocessed task indices each of which has a first periphery size and a second list including a plurality of processed task indices each of which has a second periphery size smaller than the first periphery size,
wherein, in the display control process, when attribution of one of the unprocessed task indices in the first list is changed to a processed task index, a periphery size of the changed-to-processed task index, the attribution of which is changed to the processed task index, is reduced from the first periphery size to a third periphery size which is smaller than the first periphery size and larger than the second periphery size, and the changed-to-processed task index is displayed in a moving manner from the first list to the second list so that the changed-to-processed task index is visually recognized as passing behind other unprocessed task indices.

2. The work support system according to claim 1, wherein, in the display control process, the changed-to-processed task index is displayed in the moving manner from the first list to the second list so that a track of the moving is displayed.

3. The work support system according to claim 1, wherein, in the display control process, when the changed-to-processed task index is displayed in the moving manner from the first list to the second list, other unprocessed task indices are displayed in a moving manner so as to fill in a blank in the first list generated by the displaying of the changed-to-processed task index in the moving manner.

4. The work support system according to claim 1, wherein, in the display control process, a plurality of processed buttons respectively associated with the plurality of unprocessed task indices to change attribution of the respective associated unprocessed task indices to processed task indices are displayed, and when the changed-to-processed task index is displayed in the moving manner from the first list to the second list, a recover button to change attribution of the processed task index to an unprocessed task index is displayed instead of the associated processed button.

5. The work support system according to claim 1, wherein, in the display control process, when attribution of one of the processed task indices in the second list is changed to an unprocessed task index, the changed-to-unprocessed task index, the attribution of which is changed to the unprocessed task index, is enlarged from the second periphery size to the first periphery size to be displayed and is displayed in a moving manner from the second list to the first list so that the changed-to-unprocessed task index is visually recognized as passing in front of other unprocessed task indices.

6. The work support system according to claim 5, wherein, in the display control process, when attribution of said one of the processed task indices in the second list is changed to an unprocessed task index, while the changed-to-unprocessed task index is displayed in the moving manner from the second list to the first list, a periphery size of the unprocessed task indices displayed in the first list is reduced from the first periphery size to the third periphery size to be displayed.

7. A work support method, comprising:
performing display control to display, on a display, a first list including a plurality of unprocessed task indices each of which has a first periphery size and a second list including a plurality of processed task indices each of which has a second periphery size smaller than the first periphery size,
wherein, in the display control, when attribution of one of the unprocessed task indices in the first list is changed to a processed task index, a periphery size of the changed-to-processed task index, the attribution of which is changed to the processed task index, is reduced from the first periphery size to a third periphery size which is smaller than the first periphery size and larger than the second periphery size, and the changed-to-processed task index is displayed in a moving manner from the first list to the second list so that the changed-to-processed task index is visually recognized as passing behind other unprocessed task indices.

8. The work support method according to claim 7, wherein, in the display control, the changed-to-processed task index is displayed in the moving manner from the first list to the second list so that a track of the moving is displayed.

9. The work support method according to claim 7, wherein, in the display control, when the changed-to-processed task index is displayed in the moving manner from the first list to the second list, other unprocessed task indices are displayed in a moving manner so as to fill in a blank in the first list generated by the displaying of the changed-to-processed task index in the moving manner.

10. The work support method according to claim 7, wherein, in the display control, a plurality of processed buttons respectively associated with the plurality of unprocessed task indices to change attribution of the respective associated unprocessed task indices to processed task indices are displayed, and when the changed-to-processed task index is displayed in the moving manner from the first list to the second list, a recover button to change attribution of the processed task index to an unprocessed task index is displayed instead of the associated processed button.

11. The work support method according to claim 7, wherein, in the display control, when attribution of one of the processed task indices in the second list is changed to an unprocessed task index, the changed-to-unprocessed task index, the attribution of which is changed to the unprocessed task index, is enlarged from the second periphery size to the first periphery size to be displayed and is displayed in a moving manner from the second list to the first list so that the changed-to-unprocessed task index is visually recognized as passing in front of other unprocessed task indices.

12. A non-transitory computer-readable recording medium storing a program that is executable by a computer to cause the computer to perform functions comprising:

a display control process to display, on a display, a first list including a plurality of unprocessed task indices each of which has a first periphery size and a second list including a plurality of processed task indices each of which has a second periphery size smaller than the first periphery size, wherein, in the display control process, when attribution of one of the unprocessed task indices in the first list is changed to a processed task index, a periphery size of the changed-to-processed task index, the attribution of which is changed to the processed task index, is reduced from the first periphery size to a third periphery size which is smaller than the first periphery size and larger than the second periphery size, and the changed-to-processed task index is displayed in a moving manner from the first list to the second list so that the changed-to-processed task index is visually recognized as passing behind other unprocessed task indices.

13. The recording medium according to claim 12, wherein, in the display control process, the changed-to-processed task index is displayed in a moving manner from the first list to the second list so that a track of the moving is displayed.

14. The recording medium according to claim 12, wherein, in the display control process, when the changed-to-processed task index is displayed in a moving manner from the first list to the second list, other unprocessed task indices are displayed in a moving manner so as to fill in a blank in the first list generated by the displaying of the changed-to-processed task index in the moving manner.

15. The recording medium according to claim 12, wherein, in the display control process, a plurality of processed buttons respectively associated with the plurality of unprocessed task indices to change attribution of the respective associated unprocessed task indices to processed task indices are displayed, and when the changed-to-processed task index is displayed in the moving manner from the first list to the second list, a recover button to change attribution of the processed task index to an unprocessed task index is displayed instead of the associated processed button.

16. The recording medium according to claim 12, wherein, in the display control process, when attribution of one of the processed task indices in the second list is changed to an unprocessed task index, the changed-to-unprocessed task index, the attribution of which is changed to the unprocessed task index, is enlarged from the second periphery size to the first periphery size to be displayed and is displayed in a moving manner from the second list to the first list so that the changed-to-unprocessed task index is visually recognized as passing in front of other unprocessed task indices.

* * * * *